(12) United States Patent
Estabrook et al.

(10) Patent No.: US 9,821,951 B2
(45) Date of Patent: Nov. 21, 2017

(54) COMPOSITIONS, SYSTEMS AND METHODS FOR PORTION-PACKAGED SOUPS AND MEALS

(71) Applicant: Keurig Green Mountain, Inc., Waterbury, VT (US)

(72) Inventors: Richard Estabrook, Waterbury, VT (US); Marc Angotti, Stowe, VT (US); Thomas J. Novak, Stowe, VT (US)

(73) Assignee: Keurig Green Mountain, Inc., Waterbury, VT (US)

( * ) Notice: Subject to any disclaimer, the term of this patent is extended or adjusted under 35 U.S.C. 154(b) by 345 days.

(21) Appl. No.: 14/471,061

(22) Filed: Aug. 28, 2014

(65) Prior Publication Data

US 2014/0370163 A1 Dec. 18, 2014

Related U.S. Application Data

(63) Continuation of application No. 13/523,995, filed on Jun. 15, 2012, now Pat. No. 8,834,948.

(Continued)

(51) Int. Cl.
*B65D 85/804* (2006.01)
*A47J 31/40* (2006.01)
(Continued)

(52) U.S. Cl.
CPC ........ *B65D 85/8046* (2013.01); *A47J 31/407* (2013.01); *B65D 51/246* (2013.01);
(Continued)

(58) Field of Classification Search
CPC B65D 85/8043; B65D 85/8046; B65D 51/28; B65D 81/3205; B65D 1/20; B65D 51/246; B65D 81/3216; A47J 31/407
See application file for complete search history.

(56) References Cited

U.S. PATENT DOCUMENTS 3,955,742 A 5/1976 Marshall et al.
4,036,398 A 7/1977 Hoogvelt et al.
(Continued)

FOREIGN PATENT DOCUMENTS

CN 201183643 Y 1/2009
FR 1499402 9/1966
(Continued)

OTHER PUBLICATIONS

International Search Report and Written Opinion from corresponding PCT Application No. PCT/US2012/042581, dated Oct. 9, 2012.

*Primary Examiner* — Erik Kashnikow
*Assistant Examiner* — Chaim Smith
(74) *Attorney, Agent, or Firm* — Wolf, Greenfield & Sacks, P.C.

(57) ABSTRACT

Methods and systems for producing a food product having a liquid component and an insoluble component, such as soups or stews. A food product assembly may include a cartridge containing a liquid component medium that is usable by a beverage forming machine to produce a liquid component of the food product. A second container, to which the cartridge may be removably attached, may contain the insoluble component of the food product, and may receive the liquid component so as to hold both the insoluble component and liquid component together, e.g., for consumption by a user.

22 Claims, 9 Drawing Sheets

Related U.S. Application Data

(60) Provisional application No. 61/520,901, filed on Jun. 16, 2011.

(51) Int. Cl.
  *B65D 81/32* (2006.01)
  *B65D 51/24* (2006.01)
  *B65D 51/28* (2006.01)

(52) U.S. Cl.
  CPC ......... *B65D 51/28* (2013.01); *B65D 81/3205* (2013.01); *B65D 81/3216* (2013.01); *B65D 85/8043* (2013.01)

(56) References Cited

U.S. PATENT DOCUMENTS

| | | | |
|---|---|---|---|
| 4,191,101 A | | 3/1980 | Ogawa |
| 4,314,650 A | | 2/1982 | Cillario |
| 4,346,833 A | | 8/1982 | Bernhardt |
| 4,393,988 A | | 7/1983 | Burke |
| 4,886,674 A | | 12/1989 | Seward et al. |
| 5,025,611 A | * | 6/1991 | Garwood ............... B65B 11/50 426/324 |
| 5,082,115 A | | 1/1992 | Hutcheson |
| 5,251,758 A | * | 10/1993 | Kolacek ............... A47G 21/00 206/459.5 |
| 5,443,174 A | * | 8/1995 | Bauer ............... B65D 51/246 206/541 |
| 5,456,351 A | | 10/1995 | Johnson |
| 5,705,212 A | * | 1/1998 | Atkinson ............ B65D 51/247 206/542 |
| 5,722,558 A | | 3/1998 | Thompson |
| 5,853,105 A | | 12/1998 | Roman et al. |
| 6,152,362 A | | 11/2000 | Rosenfeld |
| 6,412,653 B1 | * | 7/2002 | Waterhouse ......... B01F 13/002 206/542 |
| 6,472,007 B2 | | 10/2002 | Bezek et al. |
| 6,681,958 B2 | | 1/2004 | Sorenson et al. |
| 7,168,461 B2 | | 1/2007 | DeJonge |
| 8,834,948 B2 | | 9/2014 | Estabrook et al. |
| 2002/0060220 A1 | | 5/2002 | Torniainen et al. |
| 2004/0094548 A1 | | 5/2004 | Laveault |
| 2005/0051549 A1 | | 3/2005 | Nelson |
| 2005/0211102 A1 | | 9/2005 | Vu et al. |
| 2005/0255201 A1 | | 11/2005 | Gruhot et al. |
| 2006/0151414 A1 | | 7/2006 | Mullen |
| 2007/0000922 A1 | | 1/2007 | Vovan et al. |
| 2007/0278122 A1 | | 12/2007 | McCumber et al. |
| 2008/0110885 A1 | | 5/2008 | Cross |
| 2008/0148948 A1 | | 6/2008 | Evers |
| 2008/0164253 A1 | | 7/2008 | Truong |
| 2008/0210686 A1 | | 9/2008 | Shapiro et al. |
| 2008/0245682 A1 | | 10/2008 | Foulke |
| 2009/0004336 A1 | | 1/2009 | La et al. |
| 2009/0200301 A1 | | 8/2009 | Beekman et al. |
| 2009/0311389 A1 | | 12/2009 | Zoss et al. |
| 2010/0003379 A1 | | 1/2010 | Zoss et al. |
| 2010/0015293 A1 | | 1/2010 | Shaprio et al. |
| 2010/0112146 A1 | | 5/2010 | Zoss |
| 2010/0260901 A1 | | 10/2010 | Zoss et al. |
| 2011/0244108 A1 | | 10/2011 | Rabin |
| 2011/0280998 A1 | | 11/2011 | Lorence et al. |
| 2012/0321756 A1 | | 12/2012 | Estabrook et al. |

FOREIGN PATENT DOCUMENTS

| | | |
|---|---|---|
| GB | 01180059 | 2/1970 |
| JP | S60-047258 U | 4/1985 |
| JP | S61-142156 A | 6/1986 |
| JP | H02-045377 A | 2/1990 |
| JP | 2006-306401 A | 11/2006 |
| JP | 3133066 U | 6/2007 |
| JP | 2008-504848 A | 2/2008 |
| JP | 2008-189329 A | 8/2008 |
| JP | 2010-515625 A | 5/2010 |
| TW | M244269 Y | 9/2004 |
| WO | WO 0104007 A2 | 1/2001 |
| WO | WO 2007081112 A1 | 7/2007 |

\* cited by examiner

COMPOSITIONS, SYSTEMS AND METHODS FOR PORTION-PACKAGED SOUPS AND MEALS

CROSS REFERENCE TO RELATED APPLICATIONS

This application is a continuation of U.S. patent application Ser. No. 13/523,995, filed Jun. 15, 2012, which claims the benefit of U.S. Provisional application No. 61/520,901, filed Jun. 16, 2011, each of which is hereby incorporated by reference in its entirety.

BACKGROUND

Beverage systems that use a beverage cartridge to form a drinkable beverage are known, for example, from U.S. Pat. No. 7,165,488.

SUMMARY OF INVENTION

Aspects of the invention relate to using a machine to form a portion-packaged soup or food, such as a soup that includes a liquid component (such as a broth) and an insoluble component (such as noodles, rice, dried vegetables, etc.). In one embodiment, the machine may be a beverage forming machine that is arranged to use a beverage cartridge to make a beverage, such as coffee, tea, hot chocolate, etc. A cartridge may be provided to the machine and used to form a liquid component of a meal, such as a broth for soup. The liquid component formed by the machine may be deposited into a second container that contains an insoluble component, such as noodles, and that was physically attached to and/or at least partially enclosed the cartridge prior to its use in forming the liquid food component. By physically associating the cartridge and second container prior to use in forming a food product, a user can be assured that a correct cartridge is used to form the liquid component combined with the insoluble component.

In one aspect of the invention, a method for forming a food product includes providing a cartridge including a first container having a closed interior space and a liquid component medium located in the interior space. The liquid component medium may be a dry, soluble powder, a syrup or other liquid concentrate, or other suitable material. A second container may be provided including a closed interior space and an insoluble component located in the closed interior space. As noted above, the insoluble component may include rice, noodles, dried food particles such as vegetables and/or meats, and so on. The cartridge may be associated with a cartridge receiver of a beverage forming machine, such as by placing the cartridge in a cartridge holder of the beverage forming machine. The closed interior space of the second container may also be opened, e.g., to ready the second container to receive a liquid component produced by the beverage forming machine and the cartridge. Thus, the beverage forming machine may be caused to produce a liquid component of the food product, e.g., by mixing a liquid with the liquid component medium of the cartridge, and the liquid component may be dispensed from the beverage forming machine directly into the second container such that the second container holds the liquid component and the insoluble component of the food product.

In one embodiment, the cartridge and the second container may be initially attached together, and the step of associating the cartridge may include separating the cartridge from the second container prior to associating the cartridge with the cartridge receiver. The cartridge and the second container may be separable by hand and without tools to allow the cartridge to be provided alone to a cartridge receiver of a beverage forming machine. This feature may make the production of a food product, such as oatmeal, soup, stew or other foods having liquid and insoluble components, convenient and fool proof since the user can be assured that the cartridge and insoluble components are properly used together. Also, in some arrangements, the liquid component medium and the insoluble component may be separated from each other by an impermeable barrier, e.g., by a lid that closes the cartridge or second container to help ensure that the ingredients remain isolated and ready to make a quality product.

Attachment of the cartridge and second container may be accomplished in a variety of different ways. For example, the cartridge may be attached to a lid of the second container, with the lid closing the interior space of the second container. In one arrangement, the cartridge may be at least partially received in a recess of the lid, e.g., the lid may have a cavity sized and configured to receive the cartridge. The lid may have an outer side and an inner side exposed to the interior space of the second cartridge in a first orientation, and the lid may be arranged to engage with the second container in a second orientation in which the outer side is exposed to the interior space of the second cartridge. This arrangement may be useful where a cavity in the lid that receives the cartridge extends into the interior space of the second container. By allowing the lid to be flipped in orientation so the inner side is positioned on a side opposite the interior space of the second container, the cavity portion of the lid may avoid contact with a food product in the interior space.

In another arrangement, the second container may include a handle attached to a body that defines the interior space of the second container, and prior to separation of the cartridge from the second container, the cartridge may be attached to the handle. For example, the handle may define a cavity that receives the cartridge prior to separation of the cartridge from the second container. In some cases, the second container may include a lid that covers the interior space of the body and the cavity of the handle, e.g., to keep the cartridge in the cavity prior to removal. The lid may also include a utensil that is removable from the lid, e.g., by tearing the utensil portion of the lid by way of a perforation or other line of weakness.

In another arrangement, the cartridge includes the first container, having a first rim that defines a first opening of the container, and a lid that covers the first opening, and the second container includes a second rim defining a second opening, and wherein prior to separation of the cartridge from the second container, the first and second rims are engaged with each other. For example, the second container may be placed over the cartridge so that the two rims engage with each other and the second container is positioned much like a lid over the cartridge.

As noted above, the liquid component medium may include any suitable material, such as dry or liquid materials that are soluble, dissolvable or otherwise dispersible in water. Thus, some portions of the liquid component medium may not necessarily be completely soluble in water or other liquid, but rather are substantially soluble or dispersible in water or other liquid. For example, some spices or oils may not be completely soluble in hot water, but are dispersible such that very small particles are suspended or suspendable in the liquid.

In another aspect of the invention, a food product forming system may include a beverage forming machine having a cartridge receiver arranged to hold a cartridge and a liquid inlet arranged to introduce liquid into a cartridge, and a food product assembly of any of the types described above (or others). Of course, the beverage forming machine may include other components, such as where the liquid inlet includes a piercing element to form an inlet opening in the cartridge, and a liquid outlet includes a piercing element to form an outlet opening in the cartridge to allow liquid component to exit the cartridge. The beverage forming machine may also include a liquid supply (e.g., including a water reservoir, pump, heating tank, suitable flow conduits, etc.) arranged to deliver liquid to the liquid inlet for introduction into the cartridge and/or a support, such as a drip tray, arranged to support the second container in a position in which liquid component is directed into the second container. Accordingly, the beverage forming machine may pierce the cartridge with a piercing element to form an inlet opening in the cartridge, introduce liquid into the cartridge via the inlet opening, pierce the cartridge with a piercing element to form an outlet opening in the cartridge, and allowing liquid component to exit the cartridge via the outlet opening.

In another aspect of the invention, a food product assembly for use with a beverage forming machine to make a food product includes a cartridge, includes a first container having a closed interior space and a liquid component medium located in the interior space, the cartridge being arranged for receipt and use by a beverage forming machine to produce a liquid component of a food product by introducing liquid into the cartridge for interaction with the liquid component medium. The assembly also includes a second container attached to the cartridge, and including a closed interior space and an insoluble component located in the closed interior space. The second container may be arranged to receive a liquid component formed using the cartridge and dispensed by the beverage forming machine directly into the second container such that the second container holds the liquid component and the insoluble component of the food product. The cartridge and the second container may be attached together and be separable by hand and without tools to allow the cartridge to be held alone by the beverage forming machine. Further, the food product assembly may include any of the features discussed above or otherwise herein.

These and other aspects of the invention will be apparent from the following description and claims.

BRIEF DESCRIPTION OF THE DRAWINGS

Aspects of the invention are described with reference to the following drawings in which like numerals reference like elements, and wherein.

DETAILED DESCRIPTION

It should be understood that aspects of the invention are described herein with reference to the figures, which show illustrative embodiments. The illustrative embodiments described herein are not necessarily intended to show all embodiments in accordance with the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Figure 1:
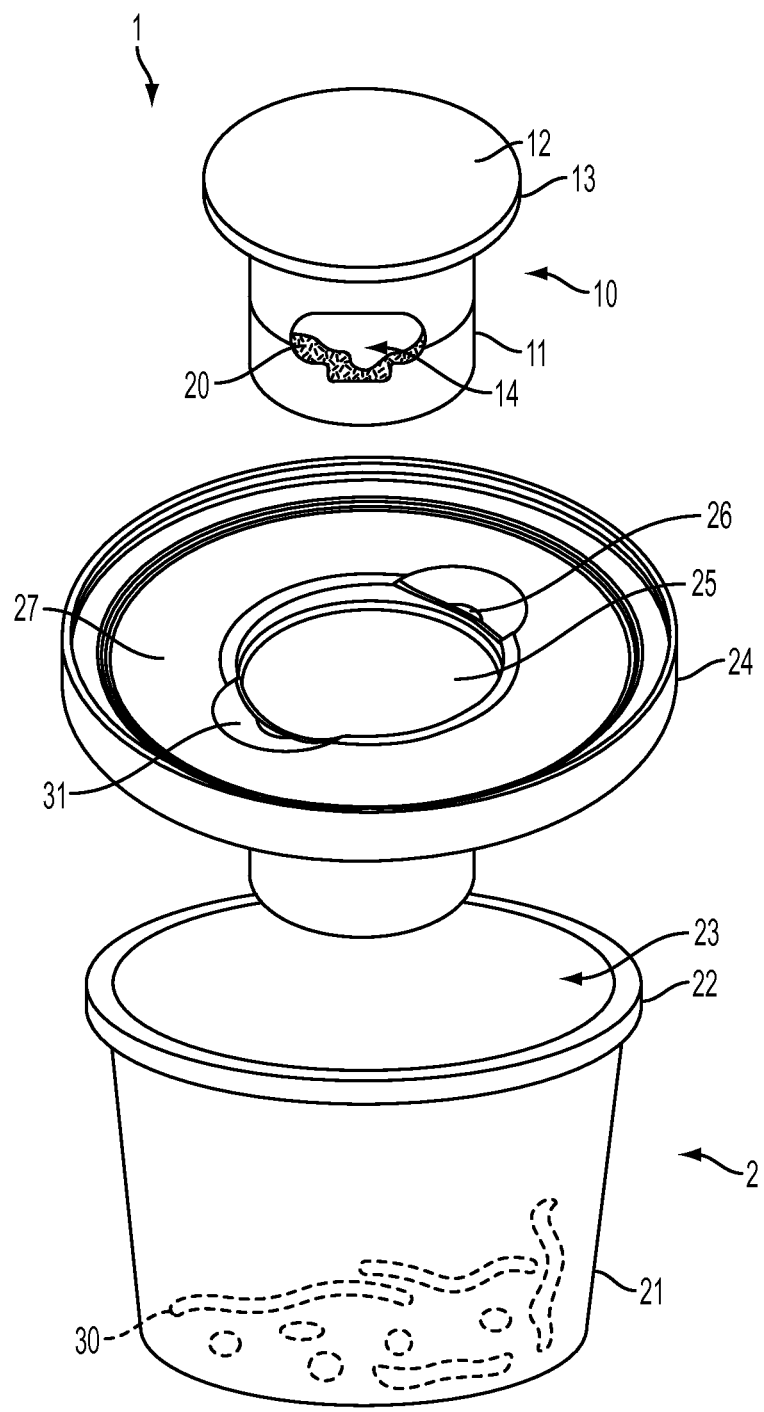
FIG. 1 is an exploded perspective view of a food product assembly in accordance with aspects of the invention.

FIG. 1 shows an exploded perspective view of an illustrative food product assembly 1 that includes a cartridge 10 and a second container 2 and that incorporates one or more aspects of the invention. The cartridge 10 may be of the same or a similar construction as that used in a beverage forming machine used to form any suitable beverage such as tea, coffee, other infusion-type beverages, beverages formed from a liquid or powdered concentrate, carbonated beverages, etc. For example, the cartridge 10 may take any of the forms described in U.S. Patent Application Publications 2005/0051478, 2012/0058226 and 2010/0303964, which are incorporated by reference in their entirety. In this illustrative embodiment, the cartridge 10 is arranged to be used by a beverage forming machine to make a liquid component of a food product that includes the liquid component, such as a broth, and an insoluble component, such as dried vegetables, noodles, and so on. Thus, the cartridge 10 may contain any suitable liquid component medium 20, e.g., powdered concentrate, a syrup or liquid concentrate, dried fruit extract or powder, powdered or liquid concentrated bouillon or other soup component, powdered infant formula or milk, powdered or liquid medicinal materials (such as powdered vitamins, drugs or other pharmaceuticals, nutriceuticals, etc.), and/or other liquid component-making material (such as powdered milk or other creamers, sweeteners, thickeners, flavorings, and so on). In many of the illustrative embodiments discussed herein, the cartridge 10 contains a liquid component medium 20 that is configured for use with a beverage forming machine to form a soup broth, but it should be understood aspects of the invention are not limited in this respect.

Although illustrative embodiments of cartridges 10 are shown in the drawings, as used herein, a "cartridge" may take any suitable form, such as a pod (e.g., opposed layers of filter paper encapsulating a beverage medium), capsule, sachet or any other arrangement. The cartridge may be impervious to air and/or liquid, or may be pervious to allow water and/or air to pass into the cartridge. The cartridge may include a filter or other arrangement to help prevent some portions of the liquid component medium from exiting the cartridge 10. Alternately, the cartridge 10 may not include a filter. To "brew" or form a liquid component as used herein includes infusion, mixing, dissolving, steeping or otherwise forming a drinkable substance using water or other liquid precursor (e.g., flavored or otherwise treated water, or other liquid whether heated or not) with a liquid component medium. Also, reference to "water" herein is to any suitable water formulation, e.g., filtered, deionized, softened, carbonated, etc., as well as any other suitable precursor liquid used to form a beverage, such as sweetened or flavored water, milk, etc.

In this illustrative embodiment, the cartridge 10 includes a first container 11 that defines an interior space 14 and has a rim 13 that defines a first opening into the interior space 14. A lid 12 is attached to the rim 13, closing the first opening (and obscuring the first opening in this view). It should be understood, however, that other arrangements for the cartridge 10 are possible. For example, the cartridge 10 may include one or more filters and/or other elements that separate the interior space 14 into two or more chambers, e.g., so as to allow liquid that mixes with a liquid component medium 20 to flow through a filter before exiting the cartridge 10. If provided, a filter may be attached to the lid 12, to the rim 13, to a sidewall of the container 11, or may not be attached at all to the container 11. A filter may function to remove materials over a certain size from a liquid, e.g., may remove coffee grounds from liquid in container 11, allowing a coffee beverage to pass through the filter and out of the cartridge 10. For example, the filter may include a piece of flexible filter paper that is arranged to allow a liquid and dissolved and/or suspended materials of a certain size to pass, yet prevent relatively large particles from flowing through the filter. Of course, the filter may have multiple stages, e.g., a coarse filter portion that filters out relatively large particles, followed by a fine filter portion that filters relatively smaller particles, and so on. In addition, the filter may include one or more portions that function to filter liquid passing through the filter, as well as portions that are impermeable or otherwise restrict flow. Thus, the filter may include two or more separate components, if desired. For example, the filter may include a rigid, impermeable plastic sleeve that is attached to the lid 12 at a location spaced inwardly from the rim 12, and at a location away from the lid 12, a porous filter paper may be attached to the sleeve. Thus, not all portions of the filter need be permeable to liquids. The filter may also have areas with different permeability, e.g., to help direct flow toward one or more areas of the filter.

The lid 12, if provided as part of the container 11, may be a flexible sheet of foil and polymer laminate material that is attached to a rim 13 of the container 11, such as by heat sealing, welding, adhering, and so on. Although in this embodiment the rim 13 is arranged as an annular flange-like element, the rim 13 may be arranged in other ways. For example, the rim 13 may be the top edge of a sidewall of the first container 11 without any flange element. The container 11 and/or the lid 12 may provide a barrier to moisture and/or gases, such as oxygen. For example, the container 11 may be made of a polymer laminate, e.g., formed from a sheet including a layer of polystyrene or polypropylene and a layer of EVOH and/or other barrier material, such as a metallic foil. Such an arrangement may provide suitable protection for the liquid component medium 20, e.g., from unwanted exposure from moisture, oxygen and/or other materials. It should be understood, however, that the container 11 and/or the lid 12 may be made of other materials or combinations of materials, such as biopolymers, compostable polymers, paper, foils, etc.

Although in this illustrative embodiment the container 11 has a generally frustoconical shape with a flat lid 12, the container 11 need not include a lid 12, may have a fluted, conical, or cylindrical shape, may be in the form of a square or rectangular cup, a domed cup, a sphere or partial sphere, or other suitable form, may have a fluted, corrugated, or otherwise shaped sidewall, and so on. Also, the container 11 need not necessarily have a defined shape, as is the case with some beverage sachets and pods. For example, although the container 11 in this embodiment has a relatively rigid and/or resilient construction so that the container 11 tends to maintain its shape, the container 11 could be made to have a more compliant and/or deformable arrangement, e.g., like a sachet container made from a sheet of deformable material. Thus, an interior space defined by the container 11 may be formed only after the container material is formed around a beverage medium, filter and/or other cartridge components, similar to when two filter paper layers (container material) are joined together around a charge of coffee grounds to form a pod or other form of cartridge. In other embodiments, the size and/or shape of the cartridge container 11 may be defined by the brew chamber in which the cartridge 10 is held.

In this illustrative embodiment, the food product assembly 1 includes a second container 2 that includes a body 21, which defines a second opening 23 to an interior space in which an insoluble component 30 is held. The insoluble component 30 of the food product may include any suitable materials, such as noodles, dried vegetables, rice, protein pieces (e.g., dried meats), and so on. As used herein, "insoluble" means that the insoluble component 30 materials are largely not soluble in water or other liquid portion of a liquid component of the food product during a typical time that the food product might be stored or otherwise kept for consumption. For example, if the food product made were a soup including broth and noodles, the noodles (an insoluble component) would not dissolve or disperse in the soup broth over a 24 hour period.

In this embodiment, the second container 2 includes a rim 22 and a lid 24 that engages with the rim 22 to close the second opening 23, e.g., to keep the insoluble component 30 in the interior space of the second container 2. The lid 24 may be sealed to the rim 22, such as by welding, adhering, etc. to provide a suitable moisture bather, and/or may physically engage the rim 22, such as by a snap or friction fit. Alternately, a secondary lid, such as a thin sheet film, maybe positioned under the lid 24 and be attached to the rim 22 or other part of the second container 2 to provide a suitable moisture, oxygen or other barrier. The lid 24 also includes a cavity 25 which is sized and shaped to receive the cartridge 10. Thus, the cartridge 10 may be placed in the cavity 25, e.g., for storage or transport of the food product assembly 1. The lid 24 may keep the cartridge 10 in place in the cavity 25 by any suitable means, such as engagement features 26 at an upper end of the cavity 25 that engage with the rim 13 of the cartridge 10. The engagement features 26 may include, for example, resilient tabs, fins, protrusions, or other features that are moveable to allow the cartridge 10 to be positioned in the cavity 25, and can engage with the cartridge 10 to hold the cartridge 10 in place. In other embodiments, however, an engagement feature 26 may include glue, a friction fit of the cavity 25 with the cartridge 10, an adhesive label applied over the cavity opening on the outer side 27 of the lid 24 to trap the cartridge 10 in place, a plastic film overwrap positioned around the food product assembly 1, and others. Accordingly, the cartridge 10 may be attached to the second container 21 in a variety of different ways. As another alternative, the lid 24 may be arranged to be generally flat, and a cartridge may be attached to the inner side 28 of the lid 24 (e.g., by a plurality of hooks depending from the inner side 28 that engage with the rim 13 of the cartridge 10) so that the cartridge hangs from the lid 24 into the interior space of the body 21. In this case, the cartridge 10 may be removed from the lid 24 by removing the lid from the body 21, and removing the cartridge 10 from the inner side 28.

In accordance with an aspect of the invention, the cartridge 10 may be used with a beverage forming machine to produce a liquid component of a food product that is dispensed by the beverage forming machine directly into the second container so that the second container holds both the liquid component and insoluble component together, e.g., for consumption of the food product from the second container. Holding the liquid component and insoluble component together may allow the insoluble component to warm (e.g., if the liquid component is dispensed in a heated condition), to absorb moisture from the liquid component (e.g., where noodles of other components absorb water to rehydrate), to mix with the liquid component (e.g., where insoluble component is a breakfast cereal and the liquid component is a milk product) or otherwise prepare the food product for consumption or use in preparing another food product. Such an arrangement can provide a very convenient way for a user to prepare a hot (or cold) food product whether at or away from home since the liquid component can be easily made, even in a heated form, and combined with the insoluble component by using an existing beverage forming machine to dispense the liquid component directly into the container holding the insoluble component. Moreover, the food product can be consumed directly from the container into which the liquid component is dispensed for combination with the insoluble component. As one example, a user could make a hot, apple-flavored oatmeal by using a beverage machine and cartridge to produce a hot apple cider-type liquid component that is dispensed directly into a container holding rolled or instant oats.

Figure 2:
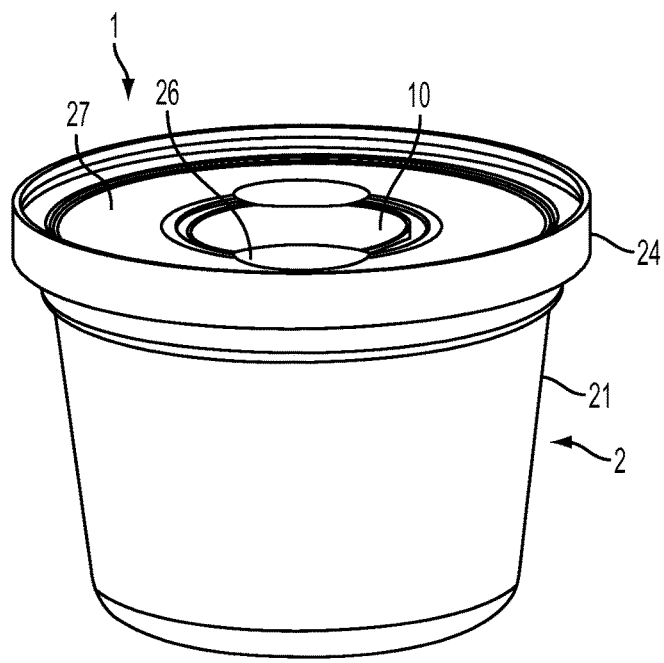
FIG. 2 is a perspective view of the FIG. 1 embodiment with a lid of a second container arranged in a first orientation.
Figure 3:
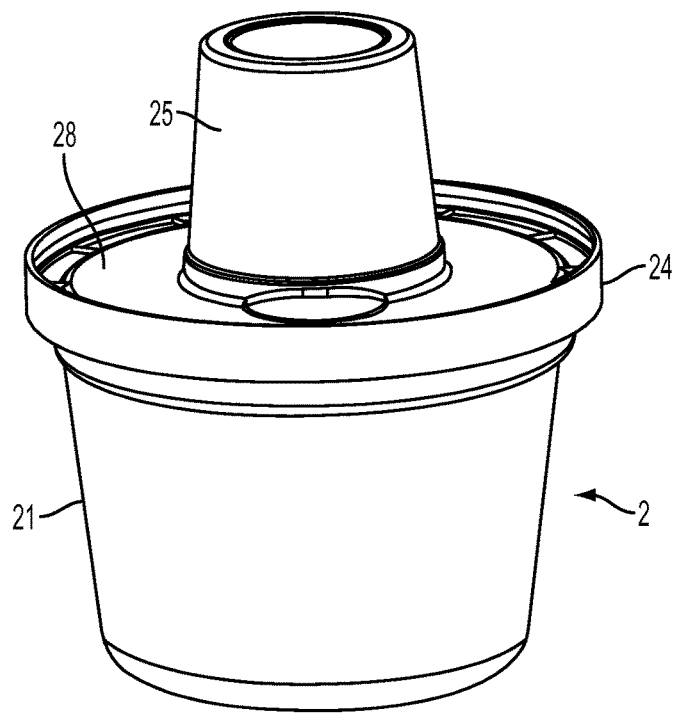
FIG. 3 is a perspective view of the FIG. 1 embodiment with a lid of a second container arranged in a second orientation.

To form such a food product using the illustrative embodiment of FIG. 1, a cartridge 10 may be first removed (detached) from the second container 21 by removing the cartridge 10 from the cavity 25. FIG. 2 shows the food product assembly 1 of FIG. 1 with the cartridge 10 received in the cavity 25. The cartridge 10 may be removed by gripping the cartridge rim 13 with fingers and pulling on the cartridge 10, e.g., to overcome any retaining force of the engagement features 26. With the cartridge 10 separated from the second container 21, the cartridge 10 may be associated with a beverage forming machine, such as by placing the cartridge 10 alone into a cartridge holder of the beverage forming machine. The lid 24 of the second container 2 may be removed, and the body 21 of the second container 2 placed to receive a liquid component made by the beverage forming machine using the cartridge 10. With the liquid component dispensed into and held by the second container 2, the lid 24 may be replaced on the rim 22, e.g., to help keep the food product warm during a rehydrating process. FIG. 3 shows the lid 24 replaced on the rim 22 of the second container 2 with an inner side 28 of the lid facing upwardly, i.e., away from the interior space of the second container 2. In this embodiment, the lid 24 is arranged so that the lid 24 can engage with the rim 22 both with the outer side 27 facing upwardly and with the inner side 28 of the lid 24 facing upwardly. Allowing the lid to be inverted allows the interior space of the second container 2 to be covered by the lid 24 without risking contact of the lower portion of the cavity 25 with the food product in the container 2. For example, if the liquid component has a volume that is near that of the interior space of the body 21, placing the lid 24 on the rim 22 in the first orientation shown in FIG. 2 may cause the cavity 25 portion to displace some of the liquid component, causing it to flow out of the second container 2. By inverting the lid 24, this result can be avoided, and can also help signal that a food product has been formed in the second container 2.

Figure 4:
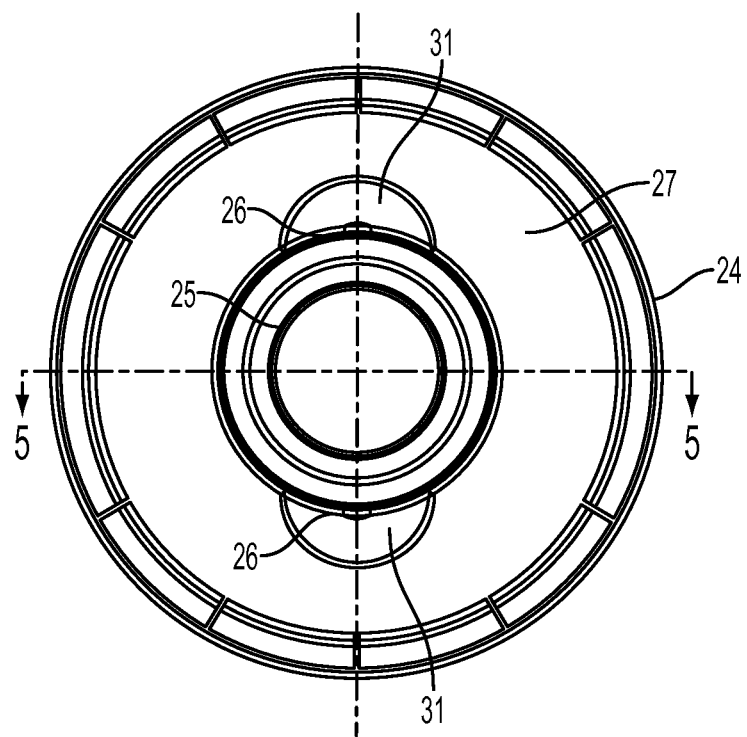
FIG. 4 is a top view of the second container lid of the FIG. 1 embodiment.
Figure 5:
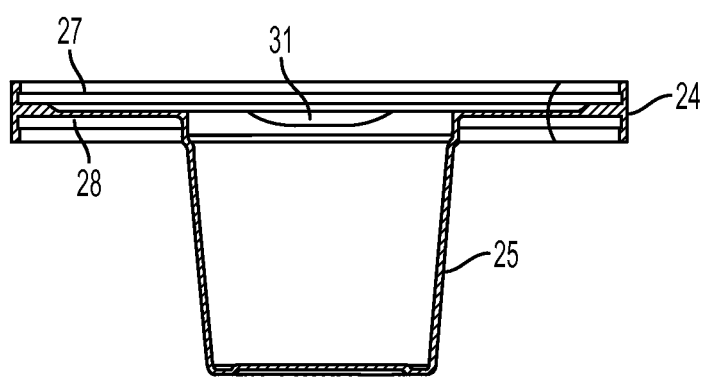
FIG. 5 is a cross sectional view along the line 5-5 of FIG. 4.

FIGS. 4 and 5 show a top view and a cross-sectional view along the line 5-5 of the lid 24 of the FIG. 1-3 embodiment. FIG. 4 shows recesses 31 that may be provided in the outer side 27 of the lid 24 adjacent the cavity 25, e.g., to help a user grip the rim 13 of the cartridge 10 to remove the cartridge 10 from the cavity 24. Of course, other arrangements are possible, such as a tether attached to the cartridge 10 that allows a user to remove the cartridge 10 by pulling on the cartridge 10. FIG. 5 illustrates that the lid 24 includes snap-fit features (e.g., grooves formed in the outer band of the lid 24) to engage with the rim 22 of the body 21 at the periphery of both the outer side 27 and the inner side 28 of the lid 24.

Figure 6:
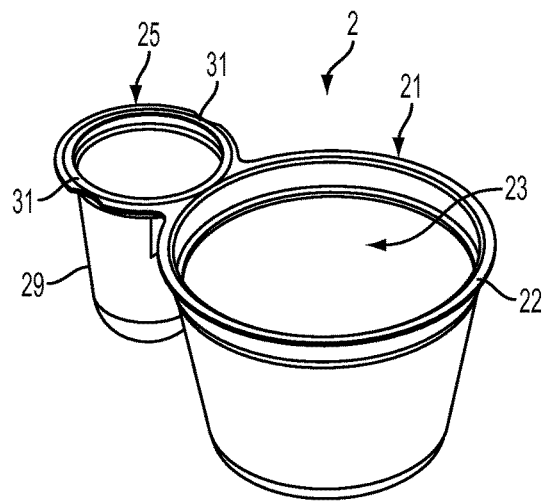
FIG. 6 shows a perspective view of another food product assembly in accordance with aspects of the invention.
Figure 7:
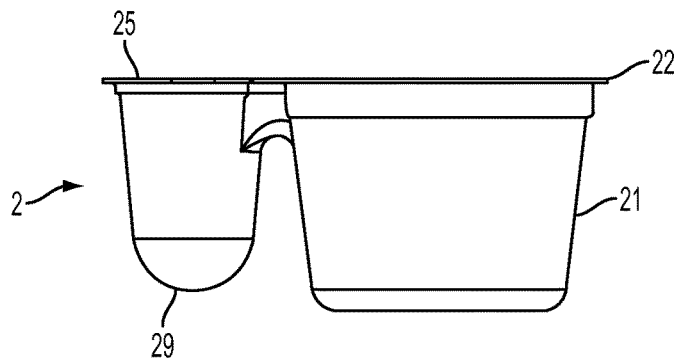
FIG. 7 is a side view of the FIG. 6 embodiment.
Figure 8:
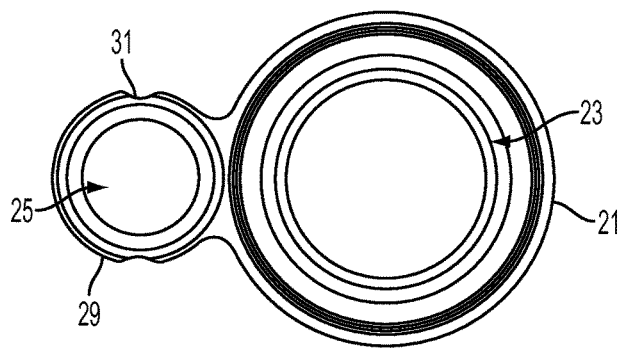
FIG. 8 is a top view of the FIG. 6 embodiment.

FIGS. 6-8 show a perspective view, side view and top view, respectively, of another illustrative embodiment of a second container 2 for use in a food product assembly 1. In this embodiment, the body 21 of the second container 2 defines a second opening 23 that provides access to an interior space defined by the body 21. A handle 29 is attached to the body 21 and defines a cavity 25 to receive a cartridge 10 (not shown). While the handle 29 may be arranged in different ways, in this embodiment a rim around the cavity 25 of the handle 29 is arranged to be flush with the rim 22 of the body 21, e.g., so that a common lid can be positioned over the rims. Also, the handle 29 is attached at an upper end to the body 21 so there is a gap or space between a lower portion of the handle 29 and the body 21 (see FIG. 7), e.g., to reduce heat transfer between the body 21 and the handle 29. One or more recesses 31 may be provided in the handle 29 to help allow a user grip a rim 13 or other portion of a cartridge 10 for removal from the cavity 25. Thus, the handle 29 may function both for support of the body 21, e.g., when consuming a food product from the interior space of the body 21, and storage of a cartridge 10. An insoluble component 30 (not shown) would typically be held in the interior space of the body 21.

Figure 9:
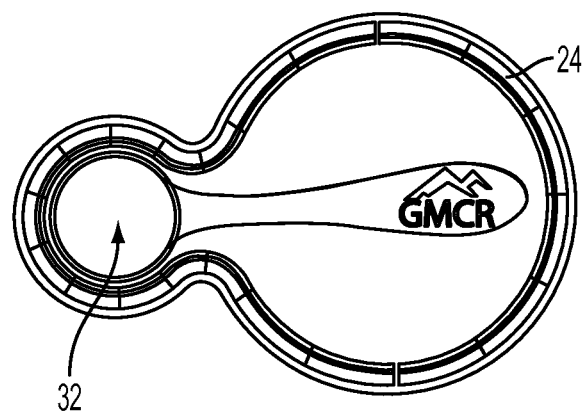
FIG. 9 is a top view of a lid for the second container of the FIG. 6 embodiment.
Figure 10:
FIG. 10 is a side view of the lid of FIG. 9.
Figure 11:
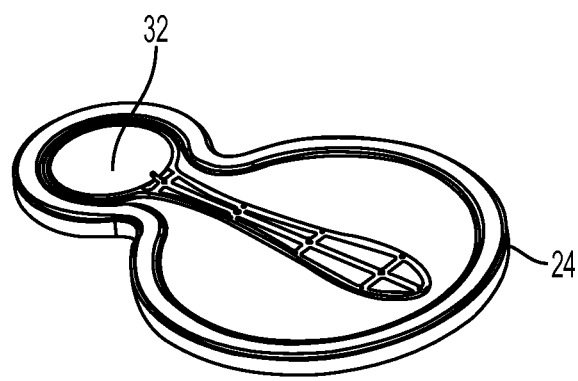
FIG. 11 is a perspective view of the lid of FIG. 9.

FIGS. 9-11 show top, side and perspective views, respectively, of a lid 24 that may be part of the second container 2 shown in FIGS. 6-8. The lid 24 is shaped to cover both the second opening 23 of the body 21 (e.g., to retain an insoluble component 30 in the body 21) and the cavity 25 (e.g., to retain a cartridge 10 in place). Of course, other arrangements are possible, such as separate lid portions for the handle 29 and body 21, a lid only provided for the body 21, and so on. In this illustrative embodiment, the lid 24 includes a utensil 32 which can be removed from the lid 24. The utensil 32 may be provided in any suitable way, such as by being adhered to the lid 24, being formed as a snap-off or otherwise removable part of the lid (e.g., by molding the lid 24 with weakened areas at the periphery of the utensil 32 so as to allow the utensil 32 to be torn from the lid 24), and so on.

Figure 12:
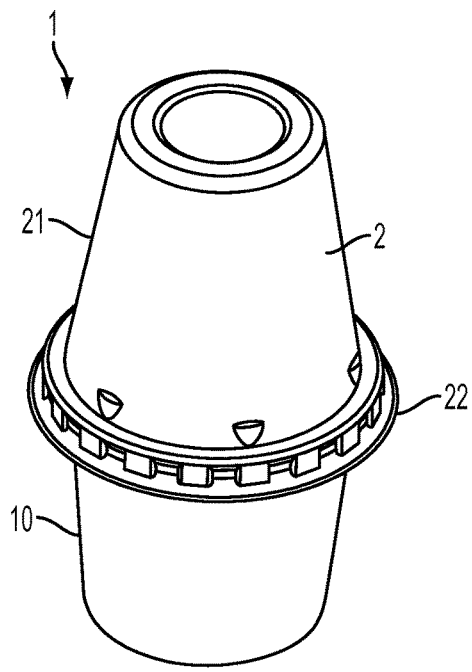
FIG. 12 shows a perspective view of another food product assembly in accordance with aspects of the invention.
Figure 13:
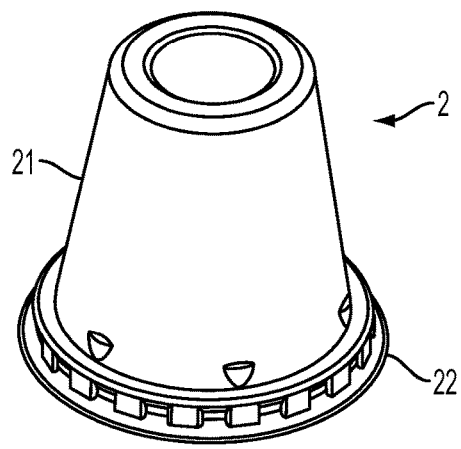
FIG. 13 is a perspective view of the second container of the FIG. 12 embodiment.
Figure 14:
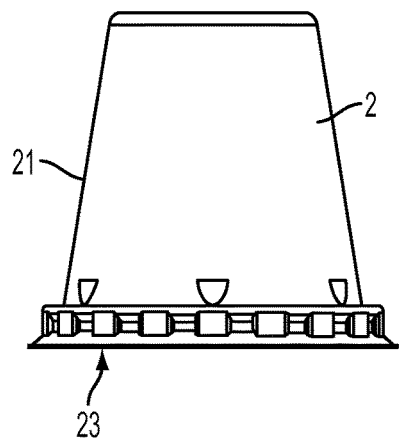
FIG. 14 is a side view of the second container of the FIG. 12 embodiment.
Figure 15:
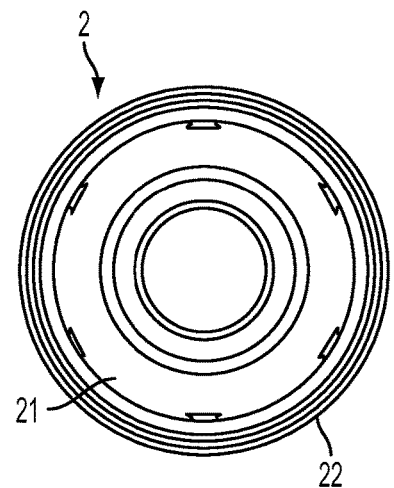
FIG. 15 is a top view of the second container of the FIG. 12 embodiment.

FIG. 12 shows a perspective view of another food product assembly 1 in an illustrative embodiment, and FIGS. 13-15 show a perspective view, side view and top view of the second container 2 of the FIG. 12 embodiment. In this arrangement, the cartridge 10 and the second container 2 are connected together at respective rims 13, 22. That is, the cartridge 10 in this embodiment is arranged like that in FIG. 1, and the second container 2 is arranged so that the rim 13 of the cartridge 10 is received by the rim 22 of the second container 2 with a snap-fit or interference fit. Insoluble components 30 may be contained in the second container 2, and may be kept in place by virtue of the cartridge 10 closing the second opening 23 of the second container 2. Alternately, a lid may be provided for the second container 2 to close the second opening 23, while still allowing the rim 13 of the cartridge 10 to be received by the rim 22 of the second container 2. For example, the lid for the second container 2 may be set somewhat inside the interior space of the body 21 and away from the rim 22, e.g., by welding the lid to the sidewall of the body 21. In another arrangement, the insoluble component 30 may be packaged in a bag or other covering that is placed loosely in the second container 2.

Even though a volume of the interior space of the body 21 may not be larger than a volume of the cartridge 10, or may be only slightly larger than the volume of the cartridge 10, the second container 2 may receive a liquid component formed by a beverage forming machine and cartridge and hold the liquid component together with an insoluble component. Alternately, the insoluble component 30 in the second container 2 may be dumped or otherwise provided into another container (such as a bowl), into which the liquid component is dispensed. As one example, the second container 2 may hold croutons or cheese that is provided into a larger bowl, which is used to receive the liquid component from the beverage forming machine.

Another feature of the FIGS. 12-15 embodiment, and an aspect of the invention, is that the second container 2 is sized and/or shaped so that the second container 2 cannot be received by a cartridge holder of a beverage forming machine that uses the cartridge 10. That is, while the second container 2 may be sized and shaped in a way similar to the cartridge, the second container 2 may include one or more features that signals to a user that the second container 2 is not properly received by the beverage forming machine. For example, the second container 2 may have a slightly larger diameter than the cartridge 10 to preclude proper placement of the second container 2 in the beverage forming machine's cartridge receive. In other arrangements, the second container 2 may be taller than the cartridge 10, may have a square or other cross-sectional shape that is different than the cartridge 10, and/or have other features that prevents proper placement of the second container 2 in the cartridge receiver. This may help prevent an attempt by a user to use the second container in the beverage forming machine.

Figure 16:
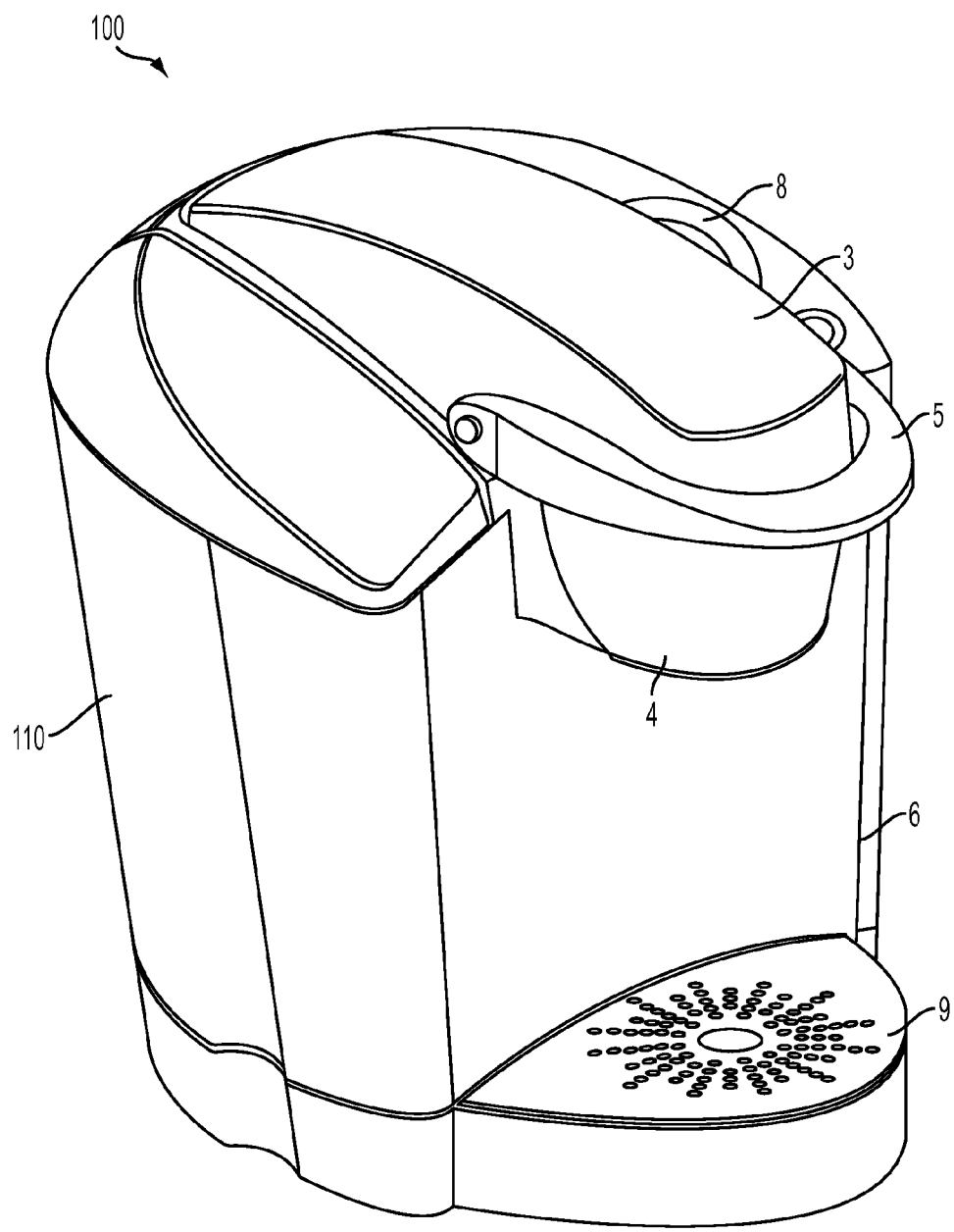
FIG. 16 shows a perspective view of a beverage forming apparatus for use in aspects of the invention.

Cartridges 10 in accordance with aspects of the invention may be used with any suitable beverage forming machine. For example, FIG. 16 shows a perspective view of a beverage forming machine 100 that may be used to form any suitable beverage, such as tea, coffee, other infusion-type beverages, beverages formed from a liquid or powdered concentrate, hot or cold drinks, etc., as well as a liquid component of a food product, which may be or include tea, coffee, etc. In this illustrative embodiment, the machine 100 includes an outer frame or housing 6 with a user interface 8 that the user may operate to control various features of the machine 100. A cartridge 10 may be provided to the machine 100 and used to form a liquid component that is deposited into a second container 2 other suitable receptacle that is placed on a drip tray 9 or other support, if any. The cartridge 10 may be manually or automatically placed in a cartridge receiver or holder defined by first and second portions 3 and 4 of the beverage forming machine 100 in this embodiment. For example, by lifting a handle 5, the user may move the first and second portions 3 and 4 to an open position to expose a suitably shaped area in which the cartridge 10 may be placed. After placement of the cartridge 10, a handle 5 or other actuator may be moved in a manual or automatic fashion so as to move the first and second portions 3 and 4 to a closed position (shown in FIG. 16), thereby at least partially enclosing the cartridge 10 within a cartridge holder. It should be understood, however, that the cartridge 10 may be received in any suitable way by the machine 100, as the way in which the machine 100 receives or otherwise uses the cartridge 10 is not critical to aspects of the invention.

Once the cartridge 10 is received, the beverage forming machine 100 may use the cartridge 10 to form a liquid component of a food product. For example, one or more inlet needles associated with the cartridge holder may pierce the cartridge 10 so as to inject heated water or other liquid into the cartridge 10. The cartridge holder may also include one or more outlet needles or other elements to puncture or pierce the cartridge 10 (if needed) at an outlet side to permit the formed liquid component to exit the cartridge 10. If the inlet and outlet are provided at a same side of the cartridge 10, such as at the lid 12 shown in FIG. 1, the cartridge 10 may be oriented during beverage formation so that the lid 12 is below a bottom of the first container 11 (e.g., with the lid 12 facing generally downward) or is otherwise oriented so that beverage can be suitably removed from the cartridge 10. Of course, other piercing approaches may be used, such as multiple needles, a shower head, a non-hollow needle, a cone, a pyramid, a knife, a blade, etc., and a beverage forming machine that uses the cartridge may include multiple piercing elements of the same type or of different types, as the invention is not limited in this respect. For example, a beverage machine may include a piercing element (such as a spike) that forms an opening and thereafter a second inlet element (such as a tube) may pass through the formed hole to introduce liquid into (or conduct liquid out of) the container. In other embodiments, the lid 12 or other cartridge portion may be pierced, or otherwise effectively opened for flow, by introducing pressure at an exterior of the lid 12 or other portion. For example, a water inlet may be pressed and sealed to the lid 12 exterior and water pressure introduced at the site. The water pressure may cause the lid 12 to be pierced or otherwise opened to allow flow into the cartridge 10. In another arrangement, the lid 12 may include a valve, conduit or other structure that opens when exposed to a suitable pressure and/or when mated with a water inlet tube or other structure.

The cartridge 10 may also be penetrated by an outlet piercing element (e.g., a needle), whether at the lid or other portion of the container 11. (The liquid inlet may similarly be located at any suitable place or places on the cartridge 10.) As with the inlet piercing arrangement, the outlet piercing arrangement may be varied in any suitable way. Thus, the outlet piercing element may include one or more hollow or solid needles, knives, blades, tubes, and so on.

Alternately, the cartridge 10 may include a valve, septum or other element that opens to permit beverage to exit when liquid is introduced into the cartridge, but otherwise remains closed (e.g., to protect the beverage medium from external conditions such as oxygen, moisture or others). In such a case, no piercing element for forming the outlet opening is necessarily required although may be used, e.g., to allow the valve or other element to open. Also, in this illustrative embodiment the piercing element may remain in place to receive beverage as it exits the opening formed in the container 11 or lid 12. However, in other embodiments, the piercing element may withdraw after forming an opening, allowing beverage to exit the opening and be received without the piercing element being extended into the cartridge.

Figure 17:
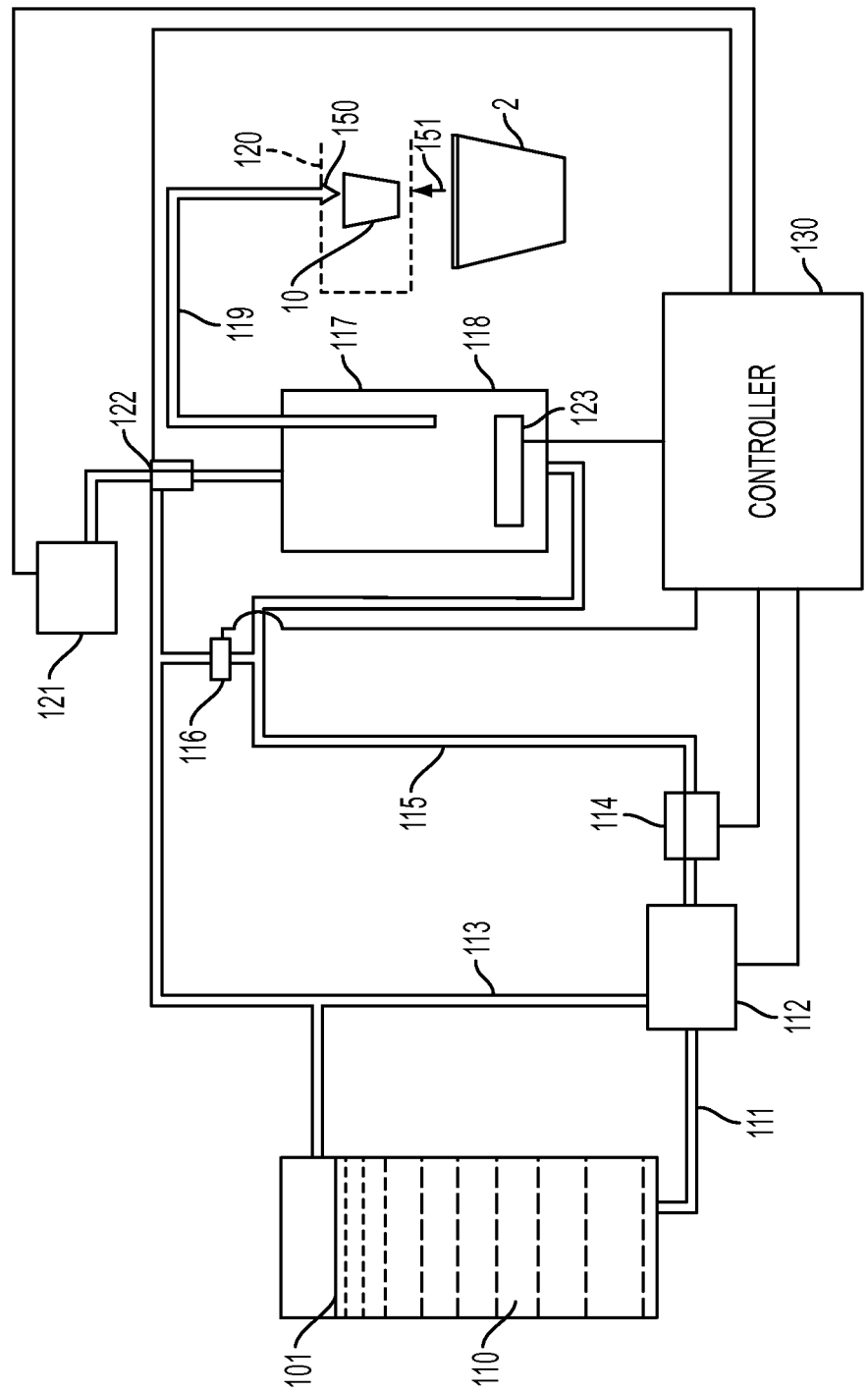
FIG. 17 is a schematic block diagram of components of a beverage forming apparatus usable in accordance with aspects of the invention.

FIG. 17 shows a schematic block diagram of various components included in a beverage forming machine 100 in one illustrative embodiment, such as that in FIG. 16. Those of skill in the art will appreciate that a beverage forming machine 100 may be configured in a variety of different ways, and thus aspects of the invention should not be narrowly interpreted as relating only to one type of beverage forming apparatus. Water or other liquid from a storage tank 110 may be provided via a supply conduit 111 to a pump 112 (such as a centrifugal pump, piston pump, solenoid pump, etc.), which pumps the liquid via a pump conduit 115 to a metering tank or chamber 118. Operation of the water pump 112 and other components of the machine 100 may be controlled by a controller 130, e.g., including a programmed processor and/or other data processing device along with suitable software or other operating instructions, one or more memories (including non-transient storage media that may store software and/or other operating instructions), temperature and liquid level sensors, pressure sensors, input/output interfaces, communication buses or other links, a display, switches, relays, triacs, or other components necessary to perform desired input/output or other functions. The metering tank 118 may be filled with a desired amount of liquid by any suitable technique, such as running the pump 112 for a predetermined time, sensing a water level in the metering tank 118 using a conductive probe sensor or capacitive sensor, detecting a pressure rise in metering tank 118 when the liquid fills the tank, or using any other viable technique. For example, the controller 130 may detect that the metering tank 118 is completely filled when a pressure sensor detects a rise in pressure indicating that the water has reached the top of the metering tank 118. Water in the tank may be heated, if desired, by way of a heating element 123 whose operation is controlled by the controller 130 using input from a temperature sensor or other suitable input. Water in the metering tank 118 may be dispensed via a metering tank conduit 119 to a cartridge receiver or holder 120 or other beverage forming station. The cartridge holder 120 may include any beverage making ingredient, such as dried soup bouillon, ground coffee, tea, a flavored drink mix, or other substance, e.g., contained in a cartridge 10. The cartridge holder 120 may include an inlet 150, e.g., including a hollow needle arranged to pierce a lid 12 of a cartridge 10 like that in FIG. 1, and an outlet 151, e.g., including a hollow needle arranged to pierce a bottom surface of a container 11 of the cartridge 10. Liquid may be discharged from the metering tank 118 by pressurizing the metering tank with air provided by an air pump 121 that causes the liquid to be discharged out of a tube 117 and into the metering tank conduit 119. Completion of the dispensing from the metering tank 118 may be detected in any suitable way, such as by detecting a pressure drop in the metering tank 118, by detecting a water level change in the metering tank 118, use of a flow meter, or using any other viable techniques. Liquid may alternately be discharged from the metering tank 118 by the pump 112 operating to force additional liquid into the tank 118, thereby displacing water out of the tank 118 and to the brew chamber. A flow sensor or other suitable device may be used to determine the amount of liquid delivered to the tank 118, and thus the amount of liquid delivered to the brew chamber. Alternately, the pump 12 may be a piston-type or metering pump such that a known volume of liquid may be delivered from the pump 112 to the tank 118, thus causing the same known volume to be delivered to the brew chamber 120. Liquid may be introduced into the cartridge 10 at any suitable pressure, e.g., 1-2 psi or higher.

The beverage forming apparatus (e.g., the controller 130) may include a RFID tag reader or other arrangement suitable to identify a cartridge or type of cartridge and control apparatus operations (such as water temperature, water volume, etc.) based on the cartridge or type of cartridge. For example, cartridges may include an RFID tag, barcode, alphanumeric text, a color code, or other machine readable indicia that the controller 130 can read or otherwise identify. Based on the indicia (which may include a serial number, an alphanumeric text string, a name or type of beverage medium in the cartridge, a type of drink to be formed using the cartridge, etc.), the controller 130 may vary the apparatus operation to adjust the type of beverage produced.

Figure 18:
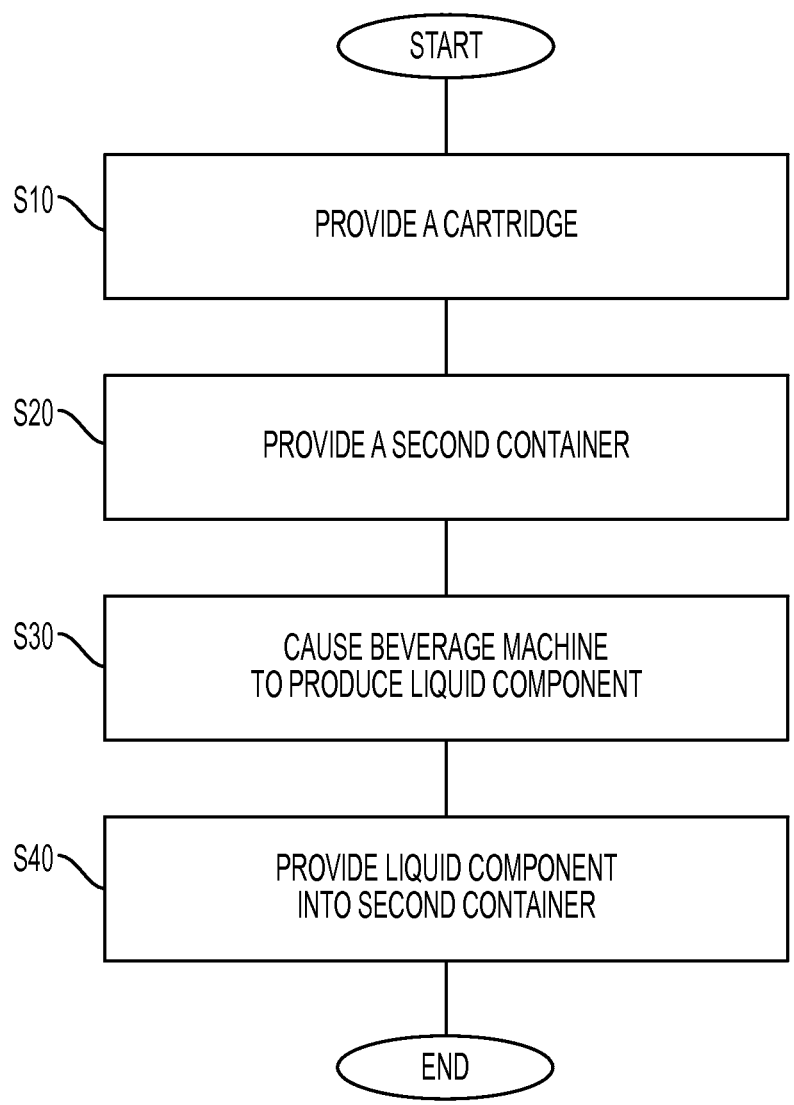
FIG. 18 shows steps in a method of preparing a beverage in accordance with aspects of the invention.

In one embodiment shown in FIG. 18, a method for forming a food product includes, in step S10, providing a cartridge, such as a cartridge arranged for use in a beverage forming machine to make a liquid component of a food product. The food may be a soup that includes a liquid component, such as broth or flavored water, and an insoluble component, such as rice, noodles or dried oatmeal. The cartridge may include a container having a closed interior space and a liquid component medium located in the interior space. As discussed above, the cartridge may take any of a variety of forms, e.g., may be permeable or impermeable, may have a sachet, pod, or other form, may include relatively rigid and/or flexible elements, may be arranged to maintain a specific shape or shapeless, may include a filter or not, if a filter is included, it may be located in the interior space of the cartridge and/or at the cartridge exterior (e.g., like that in many beverage pods), and so on.

In step S20, a second container is provided, such as a second container that is attached to the cartridge and has a closed interior space and an insoluble component in the interior space. The second container may be arranged in a variety of ways, such as having a cavity arranged to receive the cartridge, having one or more engagement features (such as hooks) arranged to engage with the cartridge to removably secure the cartridge to the second container, and so on. The second container may be arranged to receive and hold a liquid component of the food product together with the insoluble component, e.g., to allow for steeping, rehydration of the insoluble component, warming of the insoluble component, etc., and may be arranged to allow consumption of the food product directly from the second container.

In step S30, a beverage forming machine may be caused to produce a liquid component of the food product. This may be done by associating the cartridge with a cartridge receiver of the beverage forming machine and causing the beverage forming machine to mix a liquid with the liquid component medium in the cartridge 10. For example, the beverage forming machine may pierce the cartridge and inject hot, pressurized water into the cartridge to cause the desired mixing. Alternately, the beverage forming machine may direct the liquid component medium (which may be or include a dry material, syrup concentrate or other material) into a mixing chamber where water or other liquid is mixed with the medium. Thus, mixing may occur inside and/or outside of the cartridge. Any suitable liquid may be used by the beverage forming machine, such as water, filtered, carbonated or otherwise processed water, milk, juice, coffee extract, etc. Introduction of the liquid into a cartridge, if performed, may be done in any suitable way, such as by piercing the container, e.g., with a needle, and injecting liquid into the closed interior space. In other embodiments, pressurized liquid may be applied to the exterior of the cartridge container to cause one or more openings to form so as to admit the liquid. In other embodiments, the liquid may be simply poured into the cartridge, e.g., where a lid of the cartridge is removed to allow water to be poured into the cartridge. The liquid may be introduced under pressure, e.g., 1-2 psi or more, and may be introduced at any suitable flow rate and along with any other suitable materials, such as air bubbles entrained in the liquid, solid materials suspended in the liquid, etc.

In step S40, liquid component is provided into the second container. This may be done by opening the opening the closed interior space of the second container, e.g., by removing a lid of the second container, and dispensing the liquid component from the beverage forming machine directly into the second container such that the second container holds the liquid component and the insoluble component of the food product. In some embodiments, the second container may be supported by a drip tray or other part of the beverage forming machine while the liquid component is directed into the second container.

Note that aspects of the invention include not only those utility patent features described herein, but also design patent or aesthetic features of the various portions of the second containers (whether all or part of the lid, body or other parts of the second container) shown in FIGS. 1-15, as well as aesthetic features of the combined cartridge/second container arrangements, e.g., as in FIG. 12.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A food product assembly for use with a beverage forming machine to make a food product, comprising:
   a cartridge, including a first container having a closed interior space and a liquid component medium located in the interior space, wherein the cartridge is received and used by a beverage forming machine to produce a liquid component of a food product by introducing liquid into the cartridge via a cartridge inlet for interaction with the liquid component medium, the cartridge inlet being formed by piercing the cartridge with the beverage forming machine; and
   a second container attached to the cartridge, the second container including a closed interior space and an insoluble component located in the closed interior space, wherein the second container receives a liquid component formed using the cartridge, and dispensed by the beverage forming machine via a cartridge outlet directly into the second container such that the second container holds the liquid component and the insoluble component of the food product, the cartridge outlet being formed by piercing the cartridge with the beverage forming machine;
   wherein the cartridge and the second container are attached together and are separable by hand and without tools to allow the cartridge to be held alone by the beverage forming machine.

2. The assembly of claim 1, wherein the liquid component medium and the insoluble component are separated from each other by an impermeable barrier.

3. The assembly of claim 1, wherein the cartridge is attached to a lid of the second container, the lid closing the interior space of the second container.

4. The assembly of claim 3, wherein the cartridge is at least partially received in a recess of the lid.

5. The assembly of claim 4, wherein the lid has an outer side and an inner side exposed to the interior space of the second cartridge in a first orientation, and wherein the lid is arranged to engage with the second container in a second orientation in which the outer side is exposed to the interior space of the second cartridge.

6. The assembly of claim 1, wherein the second container includes a handle attached to a body that defines the interior space of the second container, and wherein the cartridge is attached to the handle.

7. The assembly of claim 6, wherein the handle defines a cavity and the cartridge is received in the cavity.

8. The assembly of claim 7, wherein the second container includes a lid that covers the interior space of the body and the cavity of the handle.

9. The assembly of claim 8, wherein the lid includes a utensil that is removable from the lid.

10. The assembly of claim 1, wherein the cartridge includes the first container, having a first rim that defines a first opening of the first container, and a lid that covers the first opening, and the second container includes a second rim defining a second opening, and wherein prior to separation of the cartridge from the second container, the first and second rims are engaged with each other.

11. The assembly of claim 1, wherein the liquid component medium includes materials that are soluble, dissolvable or otherwise dispersible in water.

12. The food product assembly of claim 1, wherein the cartridge inlet is formed by piercing the cartridge with an inlet piercing element and the cartridge outlet is formed by piercing the cartridge with an outlet piercing element.

13. A food product assembly for use with a beverage forming machine to make a food product, comprising:
   a cartridge including a closed interior space and a liquid component medium located in the interior space, the cartridge being arranged for receipt and use by a beverage forming machine to produce a liquid component of a food product by introducing liquid into the cartridge via a cartridge inlet for interaction with the liquid component medium, the cartridge inlet being formed by piercing the cartridge with the beverage forming machine; and
   a second container including a closed interior space and an insoluble component located in the closed interior space, the second container being arranged to receive a liquid component formed using the cartridge and dispensed by the beverage forming machine directly into the second container via a cartridge outlet such that the second container holds the liquid component and the insoluble component of the food product, the cartridge outlet being formed by piercing the cartridge with the beverage forming machine;

wherein the cartridge is attached to a lid of the second container, the lid closing the interior space of the second container, the cartridge being at least partially received in a recess of the lid;

wherein the cartridge and the second container are separable by hand and without tools to allow the cartridge to be held alone by the beverage forming machine.

14. The assembly of claim 13, wherein the liquid component medium and the insoluble component are separated from each other by an impermeable barrier.

15. The assembly of claim 13, wherein the lid has an outer side and an inner side exposed to the interior space of the second cartridge in a first orientation, and wherein the lid is arranged to engage with the second container in a second orientation in which the outer side is exposed to the interior space of the second cartridge.

16. The assembly of claim 13, wherein the second container includes a handle attached to a body that defines the interior space of the second container, and wherein the cartridge is attached to the handle.

17. The assembly of claim 16, wherein the handle defines a cavity and the cartridge is received in the cavity.

18. The assembly of claim 17, wherein the second container includes a lid that covers the interior space of the body and the cavity of the handle.

19. The assembly of claim 18, wherein the lid includes a utensil that is removable from the lid.

20. The assembly of claim 13, wherein the cartridge includes the first container, having a first rim that defines a first opening of the first container, and a lid that covers the first opening, and the second container includes a second rim defining a second opening, and wherein prior to separation of the cartridge from the second container, the first and second rims are engaged with each other.

21. The assembly of claim 13, wherein the liquid component medium includes materials that are soluble, dissolvable or otherwise dispersible in water.

22. The food product assembly of claim 13, wherein the cartridge inlet is formed by piercing the cartridge with an inlet piercing element and the cartridge outlet is formed by piercing the cartridge with an outlet piercing element.

* * * * *

UNITED STATES PATENT AND TRADEMARK OFFICE
CERTIFICATE OF CORRECTION

PATENT NO. : 9,821,951 B2  
APPLICATION NO. : 14/471061  
DATED : November 21, 2017  
INVENTOR(S) : Richard M. Estabrook et al.

It is certified that error appears in the above-identified patent and that said Letters Patent is hereby corrected as shown below:

In the Specification

At Column 6, Line 57, delete "bather" and replace with -- barrier --

Signed and Sealed this
Twenty-third Day of January, 2018

Joseph Matal
*Performing the Functions and Duties of the
Under Secretary of Commerce for Intellectual Property and
Director of the United States Patent and Trademark Office*